T. M. WILSON.
Lubricator.
No. 226,433.
Patented April 13, 1880.
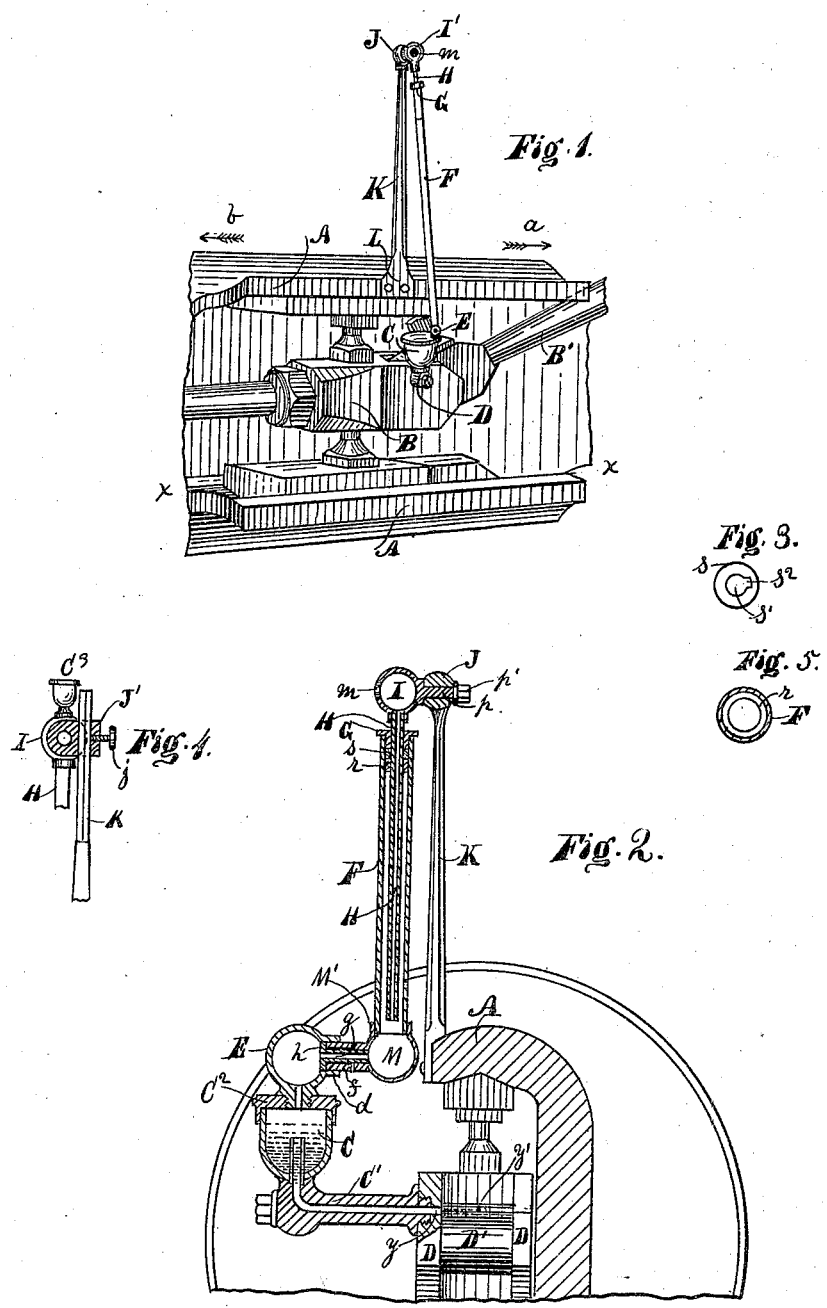

UNITED STATES PATENT OFFICE.

THOMAS M. WILSON, OF INDIANAPOLIS, INDIANA.

LUBRICATOR.

SPECIFICATION forming part of Letters Patent No. 226,433, dated April 13, 1880.

Application filed August 2, 1879.

*To all whom it may concern:*

Be it known that I, THOMAS M. WILSON, of Indianapolis, in the county of Marion and State of Indiana, have invented a new and useful device for refilling oil-cups attached to reciprocating or other moving parts of machinery and lubricating said parts while they are in motion, of which the following is a specification, reference being had to the accompanying drawings.

My invention relates to a device for filling oil-cups which are attached to moving parts of machinery and at the same time lubricate the bearings while said oil-cups and bearings are in motion.

The object of my invention is to provide a device by means of which oil-cups which are attached to the reciprocating parts or other moving parts or bearings of machinery—such, for instance, as the cross-head of an engine or the end of the connecting-rod that operates on the wrist-pin of the cross-head or crank-pin—may be refilled with oil while in motion and the bearings kept well lubricated.

My invention consists, mainly, in the new construction and arrangement of parts and in the new combination of elements, all of which, singly or combined, are deemed essential in my newly-organized device for filling oil-cups and lubricating bearings while said oil-cups and bearings are in motion, all of which will be first fully described in the specification and then set forth in the claims.

In the accompanying drawings, in which like letters of reference in the different figures indicate like parts, Figure 1 represents a perspective view of the cross-head and slide portion of an engine, showing the general arrangement of parts for lubricating the wrist-pin of the cross-head, on which one end of the connecting-rod operates. Fig. 2 is a sectional view of the device for filling the oil-cup while in motion. Fig. 3 is a plan view of a leather gasket used in the device. Fig. 4 is a modified form of the stationary standard, showing a means of adjusting the connecting telescopic tubes of the oil-cup. Fig. 5 is a sectional view of the outer oil-tube, showing a collar inside.

Referring now to the drawings, A A represent the slides of a steam-engine, in which the cross-head B operates. B' represents the connecting-rod. The cross-head B is provided with an oil-hole, $y$, which passes through the side of the cross-head and leads into the wrist-pin D' near its top, and passes nearly one-half way through the wrist-pin, and is connected with the outside by a small hole, $y'$, as shown. The outer end of the hole $y$ is enlarged and provided with a screw-thread, in which the base-piece C' of the oil-cup C is firmly screwed, so as to support the oil-cup in an upright position, as shown. The cover $C^2$ of the oil-cup is provided with a hollow casting or elbow, E, in which the pipe or tube $f$ is also screwed. Inside of the pipe or tube $f$ is another smaller pipe or tube, $g$, having at one end, on the inner side of casting or elbow E and at the end of the pipe $f$, a flange, $h$, to prevent the tube $g$ from pulling out. The other end of the pipe $g$ is screwed fast into the hollow casting or elbow M, and is thus left free to rotate in the outer pipe, $f$, as shown in Fig. 2.

To the opening M' of the casting or elbow M is firmly screwed a pipe or tube, F, said tube having near its upper end, on the inside, a ring or shoulder, $r$, to act as a stop for the leather gasket $s$. The ring or shoulder $r$ may be provided with a groove like that shown in Fig. 5, to permit air to enter or pass out through, or the collar may be bored out larger than the inner tube, H, and thus allow the air to pass freely between them.

Above the collar $r$ is the leather gasket $s$, which is provided with a hole, $s'$, that fits the outer part of the inner tube, H, and acts as a guide to hold said tube in the center of the outer pipe, F. The gasket $s$ is further provided with a recess or notch, $s^2$, to permit the free passage of air in either direction.

Above the gasket $s$ is a gland, G, for holding the gasket in place, as shown in Fig. 2.

The inner tube, H, extends from near the bottom of the tube F to a short distance above the gland G, and is provided at the upper end with a hollow casting, I, having a stud, $p$, projecting from one side and an opening or hole, $m$, in its face side, as shown. The stud $p$ is inserted in the head J of the stationary standard K, and held there by the nut and washer $p'$, but is left free to rotate in said head.

The hole $m$ is for the purpose of inserting the spout of an oil-can and filling the oil-cup C when said cup needs refilling.

The standard K is made fast to the slides A, or to any other convenient part of the engine or frame, as shown.

The head J may be made adjustable on the standard K, as shown in Fig. 4. In this case the upper end of the standard may be made square and the head J' provided with a set-screw, $j$, for holding it at any desired point.

The hollow casting I is attached to the head J' in the same manner as to the head J, and the hollow casting I may have an oil-cup, $C^3$, at the top or sides, by means of which oil can be conveyed to the pipes H and F, and from them to the oil-cup C on the cross-head; but I prefer the opening $m$ at the side, because there is no motion there to interfere with the introduction of oil, and is thus more convenient.

The operation of my improved device is as follows, to wit: Oil is poured into the upper casting, I, through the hole $m$, and runs down the tubes H and F, through the tube $g$, into the oil-cup C on the cross-head. If the engine is in motion, the same result is obtained. As the cross-head moves forward in the direction of the arrow $a$ the tube F slides on the tube H. At the same time the tube $g$ rotates partially in the tube $f$, and the stud $p$ rotates in the head J. As the cross-head approaches the center of the slides, as in Fig. 1, the tube F slides up on the tube H; but as it passes the center in the direction of the arrow $b$ the tube F is again drawn out on the tube H, and so on, thus giving a vibrating and a pulling-out and shoving-in motion to the telescopic tubes H and F at each stroke of the cross-head, the hole $m$ in the upper end, I, having no reciprocating movement; but a slight rotary movement is thus always in condition to receive the oil from the spout of an oil-can while the oil-cup C, cross-head, and wrist-pin of the cross-head may be in rapid motion.

What I claim as new, and desire to secure by Letters Patent, is—

1. The tube $g$, with collar $h$, combined with the tube $f$ and hollow castings E and M, as and for the purpose specified.

2. A device for filling movable oil-cups and lubricating, reciprocating, or other movable bearings, consisting of the movable oil-cup C, the hollow casting E, the tube $f$, the tube $g$, the tube F, the tube H, the hollow casting I, and standard J K, as and for the purpose specified.

In testimony whereof I have signed my name to this specification in the presence of two subscribing witnesses.

THOMAS M. WILSON.

Witnesses:
E. O. FRINK,
G. A. RENNETT.